Nov. 28, 1967  A. D. SINDEN  3,355,038
DUMP TRUCK PILER
Filed Dec. 1, 1965  2 Sheets-Sheet 1
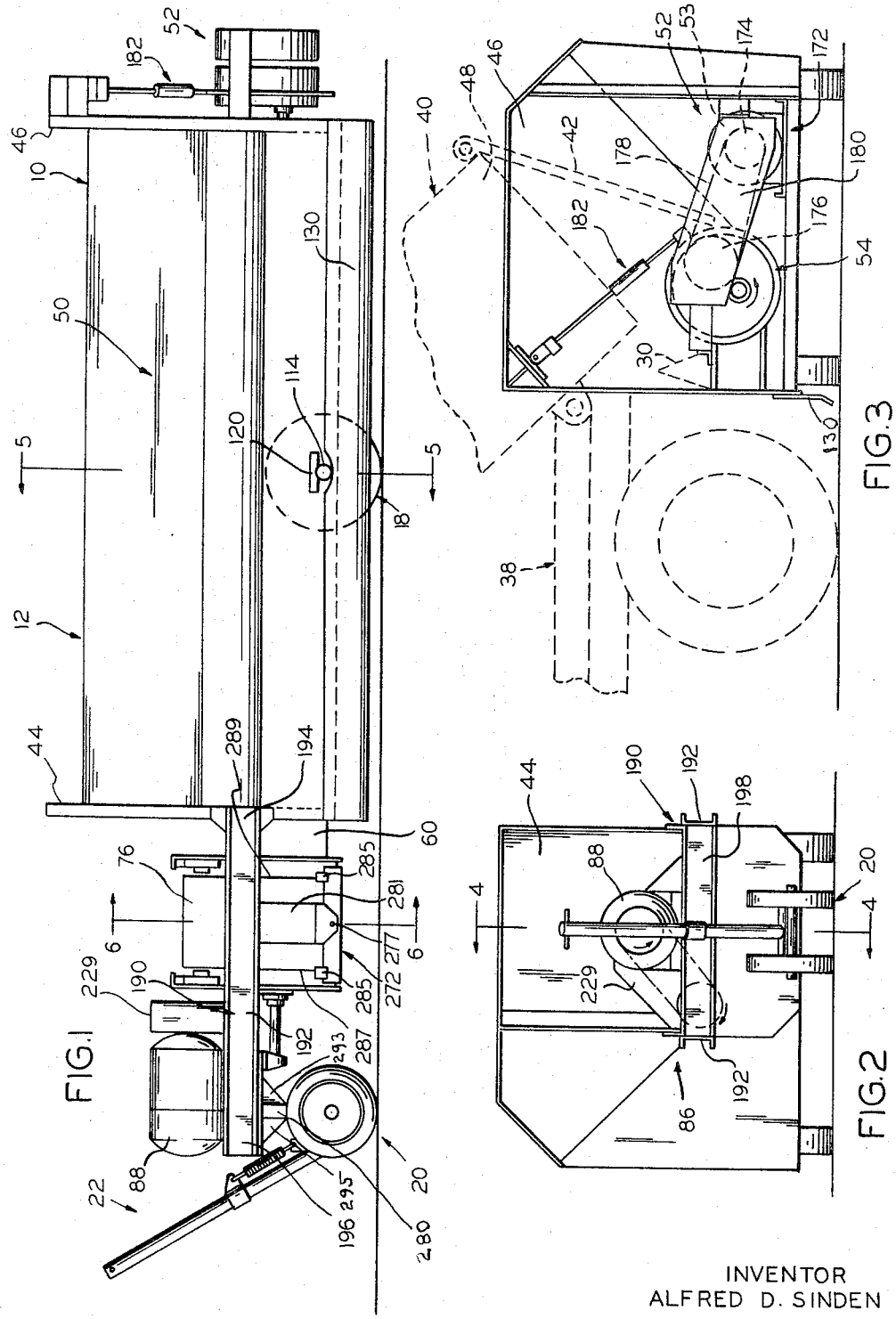
INVENTOR
ALFRED D. SINDEN
BY
Mann, Brown & McWilliams
ATTORNEYS

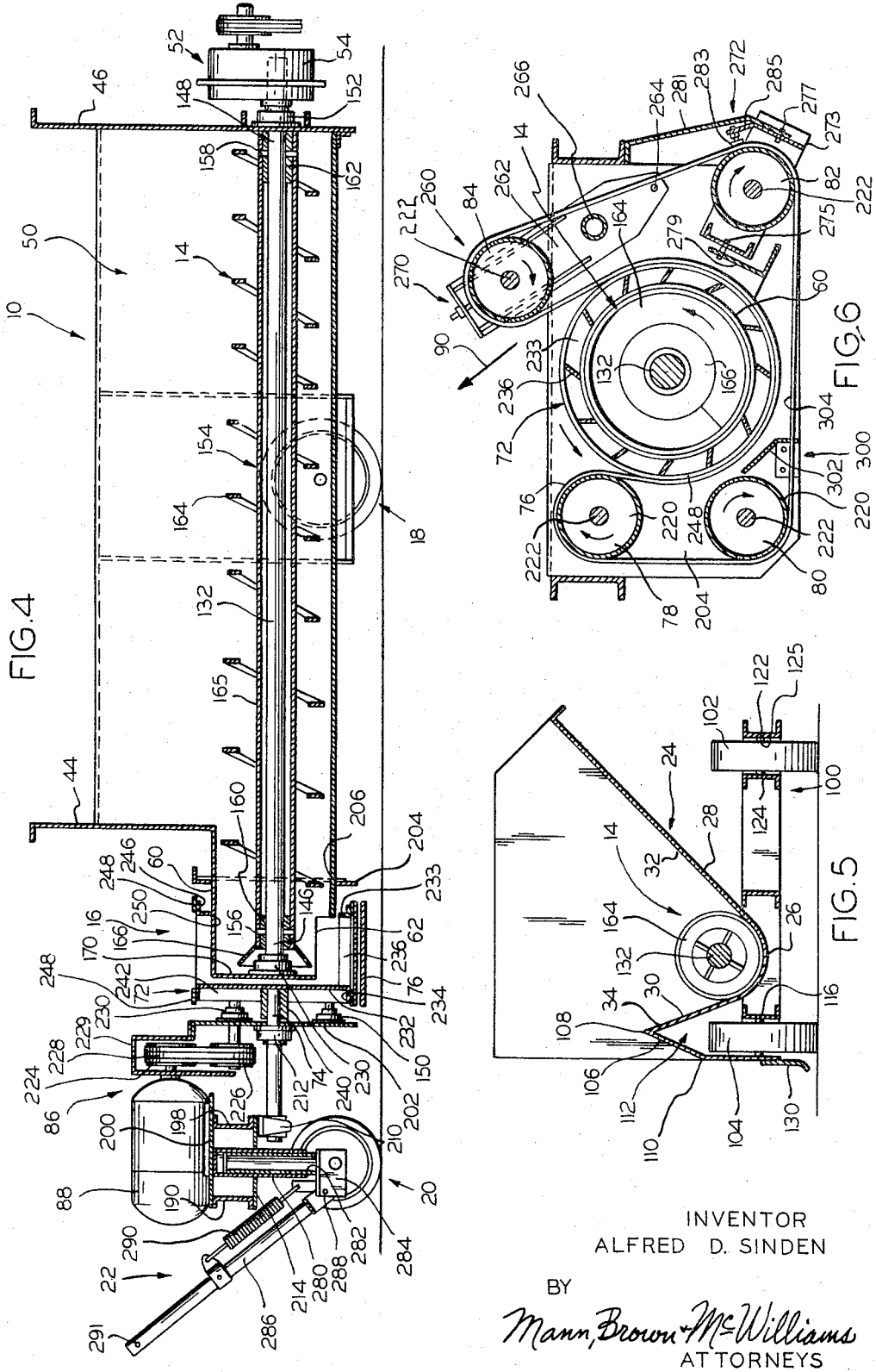

United States Patent Office 3,355,038
Patented Nov. 28, 1967

3,355,038
DUMP TRUCK PILER
Alfred D. Sinden, Aurora, Ill., assignor to Stephens-Adamson Mfg. Co., a corporation of Illinois
Filed Dec. 1, 1965, Ser. No. 510,787
Claims priority, application Australia, Sept. 29, 1965, 64,676/65
5 Claims. (Cl. 214—45)

ABSTRACT OF THE DISCLOSURE

The invention pertains to a bulk material handling piler that includes a ground supported hopper structure proportioned vertically and capacity-wise to permit ground level operating vehicles to be disposed adjacent to same and to dump their entire loads en masse into the hopper structure within the normal dumping time of the dumping vehicle, and then leave the piler to perform its piling functions. The piler includes a screw conveyor within its hopper structure, into which the dumped material has free access, operating at low speed high torque screw conveyor conditions, that feeds the material at a uniform rate to a belt thrower operating at material throwing speeds for piling of material. The apparatus is portable and is arranged so that its position can be adjusted without disturbing the dumping location for the dumping vehicles.

---

My invention relates to a truck dump piler, and more particularly, to a bulk material handling thrower apparatus that is especially adapted to receive the loads of dump vehicles and throw the material of the load into a storage pile.

Conventional systems for piling of batch loads customarily are made up of a load receiving hopper, a feeder, an elevator, and a thrower apparatus. Such systems are permanently located or, at best, not easily portable.

Conventional pilers of a portable nature, that are able to receive materials directly from batch carriers and throw it into piles, require the material to flow from the carrier in a continuous stream that is controlled by limiting size of passages either in the carrier itself or in the receiving hopper.

In one form of such apparatus the same rotating shaft turns both the screw feeder and the thrower, which means that the conveyor must rotate at the relatively high speed low torque conditions that are necessary to make the thrower operable. Therefore, the screw is necessarily protected by a cover containing slots for passage of material at a rate which will prevent the screw from being submerged.

However, many materials do not flow readily enough to make such control feasible, although the materials can be discharged en masse from a tilted truck body or power shovel. Examples of such materials are raw sugar and damp loam.

Consequently, it has not been possible prior to my invention to have an open feed piler unit which would fit under a dumping vehicle body when the latter is tilted for en masse discharging.

It is a principal object of my invention to provide a piler arrangement that directly receives the dump truck load during normal dumping time of the truck and yet is continuously operable to proceed with the piling of the dump material.

It is still another principal object of my invention to provide a continuously operable dump truck piler in the form of a wheeled portable unit that can receive from dump trucks or the like full loads of materials such as damp loam or raw sugar without interfering with the dump body or tail gate and without delaying departure of a truck for further loads.

Further objects of the invention are to provide a truck dump piler in which the screw conveyor has its own high torque low speed drive, to provide a truck dump piler that may have its position adjusted without disturbing the dumping location of the trucks, and to provide a truck dump piler arrangement that is economical of manufacture, convenient in use, and readily adapted for handling a wide variety of bulk materials.

Other objects, uses, and advantages will become obvious or be apparent from a consideration of the following detailed description and the application drawings.

In the drawings:

FIGURE 1 is a side elevational view of one embodiment of the invention;

FIGURE 2 is an end elevational view of the apparatus shown in FIGURE 1 taken from the left hand side of FIGURE 1;

FIGURE 3 is an end elevational view of the apparatus shown in FIGURE 1 taken from the right hand side of FIGURE 1 and illustrating in phantom the general positioning of a conventional dump vehicle and its dumping body when the dump vehicle load is dumped into the apparatus of FIGURE 1;

FIGURE 4 is a vertical cross-sectional view taken substantially along line 4—4 of FIGURE 2;

FIGURE 5 is a transverse cross-sectional view taken substantially along line 5—5 of FIGURE 1; and FIGURE 6 is a transverse cross-sectional view taken substantially along line 6—6 of FIGURE 1.

However, it is to be distinctly understood that the specific drawing illustrations provided are supplied primarily to comply with the requirements of the patent code and that the invention may have other specific embodiments that will be obvious to those skilled in the art.

General description

Reference numeral 10 generally indicates a preferred embodiment of the invention which comprises a hopper structure 12 in which is journalled a screw conveyor 14 which feeds the material dumped into hopper 12 to thrower apparatus 16 that operates to throw the material being handled toward the pile which forms the storage pile of the material in question.

The apparatus 10 is portable and rides on rear wheels 18 that are located at the longitudinal mid portion of the hopper structure 12, while at the forward end of the apparatus 10 a swivelling wheel assembly 20 is provided that includes a tow handle assembly 22.

As indicated in FIGURE 5, the hopper 12 is defined by a funneling portion 24 that is rectilinear longitudinally of the apparatus 10 and is in the form of an arcuate under portion 26 that has a configuration substantially complementing the outer diameter of the screw conveyor 14 and which merges into upwardly diverging side walls 28 and 30 that respectively have substantially planar upwardly directed surfaces 32 and 34 which provide unimpeded free access of the load into the screw conveyor 14.

The side wall 30 is foreshortened so that when a dump vehicle, such as that indicated at 38 in FIGURE 3, backs up to the apparatus 10, and its tail gate 42 is released, the body 40 may be tilted to its dumping position of FIGURE 3 without the tail gate 42 striking the side wall 30.

The hopper 12 at its ends is defined by front and rear end walls 44 and 46, and the walls 28, 30, 44 and 46 are proportioned to receive the rear end 48 of the dump vehicle body 40 when the body 40 is tilted to the dumping position of FIGURE 3. It will be noted from the showing of FIGURE 3 that the load in passing out of the body 40 is guided directly into the conveyor 14 by the dump body tail gate 42 and the foreshortened side wall 44.

The walls 28, 30, 44 and 46 of the hopper thus define a batch load receiving space 50 that is substantially sector-shaped in transverse cross-sectional configuration and which has extending across its rounded vertex portion the conveyor 14.

In accordance with this invention, the conveyor 14 is provided with its own drive assembly 52 which is located at the rear end of the apparatus 10 in the illustrated embodiment. The drive assembly 52 comprises a suitable motor indicated at 53 driving the conveyor 14 through appropriate shaft mounted speed reducer 54 at a speed on the order of 90 r.p.m.

The hopper structure 12 at its forward wall 44 is formed to define a tubular portion or extension 60 that journals the forward end of the screw conveyor 14 (see FIGURE 4) and is formed with a downwardly directed outlet opening 62 at its forward end that is operably associated with the thrower apparatus 16 for the purpose of permitting the conveyor 14 to feed the material dumped into hopper 12 to the thrower apparatus.

Thrower apparatus 16 comprises an open sided thrower drum 72 that is received over the end portion of hopper tubular portion 60 and that is mounted on a shaft member 74 for rotation about an axis that is coincident with the axis of rotation of the screw conveyor 14.

Trained about the periphery of the drum 72 in the manner indicated in FIGURE 6 is a thrower belt 76 that is in turn trained over drive pulley 78 and idler pulleys 80, 82 and 84. Drive pulley 78 is driven through a separate drive arrangement 86 located at the front end of the apparatus 10 including appropriate motor 88 that is coupled in any suitable manner to the drive pulley 84. The drive arrangement 86 is driven at speeds to provide appropriate throwing speed to the drum 72 and belt 76 which results in the material that passes through hopper outlet 62 into drum 72 being thrown in the general direction of arrow 90 of FIGURE 6 toward the pile of the material that is being created by the apparatus 10. For this purpose, a typical rotational speed of the drum would be on the order of 700 r.p.m.

It will thus be seen that the apparatus 10 locates directly under a dump truck at ground level and in accordance with this invention the dump truck can dump its load within the usually operating time of a dump vehicle in elevating its dump body for dumping purposes and then move on for the next load. In the meantime the screw conveyor 14 and thrower apparatus 16 continuously but separately operate to perform their respective conveying and throwing functions.

The material in the hopper 12 has direct access to the conveyor 14 and there is no opportunity for any bridging to occur. As the conveyor 14 operates under low speed high torque conditions that are suitable for a screw conveyor, the dumping of the load into the hopper 12 does not stop or materially slow down the operation of the screw conveyor, which thus continues to supply a uniform flow of the material being dumped to the thrower apparatus which in turn throws the material into the pile that is being formed.

Apparatus of the general type illustrated can be made for a wide range of handling rates. As an example, a truck dump piler may unload a five ton truck of material weighing 75 pounds per cubic foot in one minute.

While the separate drive for the screw conveyor is preferred, alternately a single drive for both the throw and screw conveyor can be used provided some suitable speed reduction arrangement is employed to drive the screw conveyor at speeds on the order indicated for conveyor 14.

*Specific description*

The hopper 12 is made up of the aforesaid walls or portions 26, 28, 30, 44 and 46 secured together in any suitable manner as by welding. In the area of rear wheels 18 a suitable framework 100 is provided that is affixed as by welding to the hopper structure and journals the individual wheels 102 and 104.

At the foreshortened side of the hopper 12, a guard sheet 106 is provided which, longitudinally of the hopper, extends between the end walls 44 and 46 of the hopper. The sheet 106 extends depthwise of the hopper from the upper edge 108 of the foreshortened wall 30 to a point below the axle level of the wheel 104 as indicated in FIGURE 5, the sheet 106 being angled as at 110 to accommodate the wheel 104. The sheets 106 and 30 thus form a pocket 112 in which the wheel 104 is positioned.

The wheel 104 is mounted on a stub shaft 114 which extends between the lower portion of the sheet 106 and the frame member 116; in the form shown, the shaft 114 extends outwardly of the sheet 106 somewhat and the outwardly extending portion is formed with a suitable slot in which is placed a keying plate 120 that is secured to the plate 106 as by means of cap screws (not shown). The wheel 102 may be secured in place between the two frame members 122 and 124 as by being applied to a suitable stub shaft 125 that is journaled between such members 122 and 124 in any suitable manner.

In the embodiment illustrated, the sheet 106 along its lower edge has secured thereto a supplemental spill guard plate 130 to keep spillage from the dumping operation away from the wheel 104. The spill guard plate may be secured in place in any suitable manner for easy removal to provide clearance when moving the piler over uneven ground.

The screw conveyor 14 comprises a shaft 132 journaled at its ends 146 and 148, respectively, by appropriate bearing units 150 and 152, respectively, which are in turn secured in any suitable manner to the hopper structure.

Received over the shaft 132 is the conveyor screw 154 which is keyed to the shaft 132 by appropriate pins 156 and 158 that also pass through the respective bushings 160 and 162 that are interposed between the shaft 132 and the screw 154. The specific screw 154 illustrated, which is best adapted for use with raw sugar, comprises right hand ribbon flights 164 having any suitable pitch and affixed in any suitable manner to tube 165; however, solid flights of any suitable known type should be used for handling other materials. As indicated in FIGURE 4, the flights should increase in diameter and pitch in the direction of material movement (from the right to the left of FIGURE 4), and this increase should be in that proportion which produces or provides a substantially uniform rate of material withdrawal or feed throughout the length of the hopper. This has the significant advantage of insuring a uniform feed rate along the hopper while at the same time reducing the torque required to turn the screw conveyor. The flight increase in pitch and diameter (outside diameter) may be gradual or in steps, and in a specific arrangement involving a screw conveyor 10 feet in length, the pitch and diameter starting at the right hand end of FIGURE 4 is as follows: the first 2 feet 11 inches has a 10 inch diameter and pitch, the next 3 feet has a 12 inch diameter and pitch, and the last 4 feet 1 inch has a pitch and diameter of 14 inches. This permits the use of commercial flight makes.

The tube contains the bushings 160 and 162 at either end thereof and is provided with an enlarged or flared end portion 166 in the area of the bearing unit 150 to protect the bearing unit 150 from the material being conveyed by the screw conveyor. As indicated in FIGURE 4, the bearing unit 150 is secured in place to the vertical end wall 170 of the tubular extension 60 of the hopper.

The motor 52 that drives the screw 154 is mounted on a suitable frame 172 and drives appropriate pulley 174 (see FIGURE 3) which turns an appropriate pulley 176 of the shaft mounted reducer 54 through appropriate pulley belt 178 (a suitable guard being applied over the pulleys and belting where indicated at 180).

The reducer 54 may be of the shaft mounted type made by Falk Manufacturing Company Size 215 J 14 with a ratio of 13.87. This device is accompanied by an overload release device generally indicated at reference numeral 182 made by the same company (Size 215 J) which is set for 750 pounds tension.

At the forward end of the apparatus 10 the thrower apparatus 16 is mounted in position by being operably associated with a suitable frame 190 comprising a pair of channel members 192 having their ends 194 affixed to the hopper structure 12 in any suitable manner as by welding, riveting or bolting.

The members 192 at their ends 196 are joined together by a pair of cross members 198 on which are mounted support plate 200 to which is secured the motor 88 that drives the thrower apparatus 16.

Also affixed between the frame members 192 are a pair of transversely disposed support plates 202 and 204 (see FIGURE 4), respectively, with the tubular portion extension 60 of the hopper 12 extending through the opening 206 of the plate 204.

The shaft 74 that mounts the drum 72 is journaled in appropriate bearing units 210 and 212 that are in turn secured to support plate 214 (affixed to cross members 198) and support plate 202, respectively.

The drive roller 78 and idlers 80, 82 and 84 are journalled for rotation between the respective plates 202 and 204. The rollers 78, 80, 82 and 84, each comprise a hollow roll member 220 affixed to a shaft member 222 in any suitable manner. In the case of the drive roll 78, its shaft member 222 is driven by motor 88 through the respective pulleys 224 and 226 (see FIGURE 4) that are coupled together by suitable pulley belts 228 (which are covered by a suitable enclosure 229). The respective shafts 222 of rollers 78 and 80 are journaled in place between plates 202 and 204 in any suitable manner as by employing appropriate bearing units that are indicated at 230 in FIGURE 4.

The thrower drum 72 generally comprises a disc member 232 connected to annular member 233 by spaced impeller blades 236. The disc member 232 and the annular member 233 are disposed in spaced parallel relation with their axes coincident, and the drum 72 is mounted for rotation about an axis that is coincident with the axis of rotation of the shaft 132. The drum 72 is provided with a sleeve 240 which is affixed to the disc in any suitable manner as by employing suitable set screws or the like. The disc 232 is provided with suitable radially extending reinforcing webs 242 that extend between the sleeve 240 and an annular flange 234 of the disc 232.

The annular member 233 is provided with a like annular flange 246, and both of the flanges 234 and 246 in the form illustrated each have applied about their peripheries belt engaging rings 248 (that may be omitted where flanges 234 and 246 are of sufficient thickness for machining purposes).

The annular member 233 of the drum 72 thus defines opening 250 through which the tubular extension 60 of the hopper extends when the drum is applied to the hopper in the manner indicated in the drawings. Opening 250 is proportioned to substantially complement the external diameter of extension 60.

The idler roller 84 is operably mounted in a belt tensioning arrangement generally indicated at 260 in the form of pivoted arms 262 pivotally mounted on the respective plates 202 and 204 by the respective pins 264, these arms being joined together by tubular member 266. The arms 262 are adjustably held in their desired operating positions in any suitable manner, as by each being provided at the axial center of member 266 with laterally extending threadably mounted bolts (not shown but received in nuts affixed to member 266 at either end thereof) that extend through and operate for guiding purposes in arcuate recesses (not shown) formed in the respective plates 202 and 204 and having a curvature that complements the arcuate movement of arms 262 about pins 264. The bolt heads extend outwardly of the respective plates 202 and 204 and carry washers for clamping engagement with the respective plates 202 and 204 when the arms 262 are in the desired position of adjustment.

The position of arms 262 thus controls the angle of throw of the material, and this may be changed by adjusting the position of arms 262 by loosening their aforesaid motion guiding bolts, placing the arms 262 in the desired position and retightening said bolts.

The shaft 222 of the idler 84 is journaled in bearing units (not shown) that may be moved longitudinally of the arm 262 by adjusting screw devices 270 in any suitable manner to adjust the tension on the belt. The specifics of the belt tensioning arrangement as viewed in FIGURE 6 are the same in connection with support plate 202.

The belt 76 is also operably associated with a self-training device that is generally indicated at 272 in FIGURE 6. Device 272 comprises a frame 273 in which is journaled shaft 222 of idler 82, with the frame 82 being mounted for pivotal movement about an axis that is normal of the axis of rotation of roller 82, as by pins 275 and 277 supported by brackets 279 and 281, respectively. Bracket 279 is affixed between support plates 202 and 204 while bracket 281 is affixed to the adjacent member 192. Guide rollers 283 and 285 are carried in spaced relation by frame 273 and are positioned to engage opposite edges 287 and 289 of belt 76. Rollers 283 are mounted on angled flanges 285 of frame 273 in the illustrated arrangement.

Referring now to the front wheel assembly 20, the plates 200 and 214 have affixed thereto a downwardly extending tubular member 280 braced by gusset plates 293 and 295 in which is received an upwardly extending pin structure 282 that is affixed to the truck 284 of the front wheels 20. The pin structure 282 is preferably secured to the top plate 200 in any suitable manner (as by a headed screw passing through plate 200 into pin structure) that would permit the truck 284 to pivot with respect to the plates 200 and 214. The tow handle assembly 22 comprises tow handle 286 that is pivotally connected to the front wheel truck 284 as by pin 288, with a tension spring 290 being employed between the front wheel truck and the handle 286 to hold the handle in the indicated upwardly inclined direction. Handle 286 may be provided with cross bar 291 for convenience in handling.

The spacing of bearing unit 210 from tubular member 280 should be that as shown in FIGURE 1 to accommodate the gusset plate 293 there illustrated, this spacing being foreshortened and the gussets omitted in the showing of FIGURE 4 to facilitate illustration.

The illustrated front wheel arrangement indicated at 20 permits the position of the apparatus 10 to be changed with respect to a pile by turning the front wheel assembly 20 until its handle is in a position of approximate tangency with the circle generated by using as a radius the distance between the axis of pin structure 282 and the mid point between rear wheels 18, and then pushing or pulling the handle to swing the hopper about a vertical axis extending through said mid point (which is located at the longitudinal center of hopper 12). Thus, the stream emerging from thrower apparatus 16 can be moved horizontally without moving the apparatus 10 longitudinally thereof away from its established operating position, thereby avoiding upsetting the dumping location for the trucks.

The thrower arrangement 16 may be provided with a pulley scraper and belt wiper where indicated at 300 in FIGURE 6, which comprises a fabricated member 302 that is fixed between plates 202 and 204 and is disposed in scraping relation to roller 80 and wiping relation to the undersurface 304 of the belt 76.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:
1. A truck dump piler comprising:
a wheeled structure comprising an open topped elongated hopper including a funneling portion at the lower end thereof,
a screw conveyor journaled in said structure and extending longitudinally of said funneling portion and generally parallel to the longitudinal dimension of said hopper,
said hopper funneling portion being defined by upwardly diverging side walls that are shaped to provide free access of the load, when dumped into the hopper, to said conveyor under the action of gravity,
thrower means mounted adjacent one end of said hopper,
said conveyor being positioned to feed the material of the load to said thrower means,
means for driving said thrower means at relatively high material throwing speeds to pile the material fed thereto by said screw conveyor,
and means for driving said conveyor at a relatively low uniform speed adapted to provide a uniform feed of the material forming the load to said thrower means when the conveyor is submerged by the load,
said screw conveyor being fully exposed to the load across the space defined by said hopper funneling portion side walls,
said wheels of said piler comprising:
a pair of wheels journaled on said piler adjacent the longitudinal center of and on either side of said hopper,
and a wheel assembly supporting said thrower means,
said wheel assembly being connected to said piler for swiveling action about a substantially vertical axis,
and a tow handle secured to said wheel assembly,
whereby said piler may be rotated in a horizontal plane about a vertical axis passing adjacent said longitudinal center of said hopper for adjusting the position of the piler for piling purposes.

2. For use in piling bulk material loads, both of the free flowing type as well as more cohesive types such as raw sugar or damp loam, carried by a dumping vehicle and the like operating at ground level that includes a tilting material receiving body having a gate at one end thereof through which the material load carried by the dumping vehicle discharges for en masse dumping when the body is tilted to an upwardly inclined position to direct said gate toward the ground,
a truck dump piler comprising:
a hopper structure comprising an open topped hopper including a rectilinear funneling portion at the lower end thereof,
means for shiftably supporting said hopper structure at ground level of operation of the dumping vehicle to receive the en masse discharged loads of the vehicle,
said hopper structure being proportioned vertically to permit the ground level supported dump vehicle to be disposed adjacent same and have its body tilted to direct the end gate thereof above and toward said hopper funneling portion for en masse discharge of the load carried thereby into said hopper structure,
said hopper structure further being proportioned to simultaneously receive en masse loads from dumping vehicle bodies whereby dumping vehicle loads may be dumped in en masse units into said hopper structure and the vehicle returned for reloading,
a screw conveyor journaled in said structure and extending longitudinally of said funneling portion,
said hopper funneling portion being defined by upwardly extending side walls that are shaped to provide free access of the load, when dumped into the hopper structure, to said conveyor under the action of gravity,
said piler further including thrower means at one end of said hopper structure,
said hopper structure at said one end thereof defining a tubular conduit portion,
said screw conveyor feeding material from the en masse load received in said hopper funneling portion into said conduit portion,
said thrower apparatus comprising:
a hollow open periphery thrower drum received over said conduit portion and journaled for rotation about an axis that substantially parallels the axis of rotation of said conveyor,
and a thrower belt trained over the under portion of said drum,
means for driving said conveyor at high torque low speed screw conveying conditions for providing a uniform feed of the material forming the load from said hopper to said thrower means when said conveyor is submerged by the load,
and means for actuating said belt and drum at material throwing speeds to throw the material feed to said belt in a stream from said trower apparatus,
said screw conveyor being fully exposed to the load across the space defined by said hopper funneling portion side walls,
whereby said piler will handle both free flowing materials as well as cohesive types such as raw sugar and damp loam without requiring material feed control to said conveyor.

3. The piler set forth in claim 2 wherein:
one of said funneling portion side walls is foreshortened to accommodate reception of the load discharging end of the dump vehicle body into said hopper as the vehicle body is moved into the tilted position thereof.

4. The piler set forth in claim 2 wherein:
said screw conveyor extends into said hopper structure conduit portion,
with the portion of said screw conveyor that extends into said conduit portion being journaled in said conduit portion,
and including separate means for journaling said thrower drum exteriorly of said conduit portion.

5. The piler set forth in claim 2 wherein:
said piler is wheeled,
and wherein the wheels of said piler comprise:
a pair of wheels journaled on said piler adjacent the longitudinal center of and on either side of said hopper,
and a wheel assembly supporting said thrower means,
said wheel assembly being connected to said piler for swiveling action about a substantially vertical axis,
and a tow handle secured to said wheel assembly,
whereby said piler may be rotated in a horizontal plane about a vertical axis passing adjacent said longitudinal center of said hopper for adjusting the position of the piler for piling purposes without moving same longitudinally thereof relative to the ground.

References Cited
UNITED STATES PATENTS

| 1,704,731 | 3/1929 | Eggert | 198—214 |
| 2,622,722 | 12/1952 | Lucas | 198—128 |
| 2,634,872 | 4/1953 | Gosse | 214—44 |

ROBERT G. SHERIDAN, *Primary Examiner.*